US006868337B2

(12) United States Patent
Muramatsu

(10) Patent No.: US 6,868,337 B2
(45) Date of Patent: Mar. 15, 2005

(54) PORTABLE NAVIGATION DEVICE AND SYSTEM, AND ONLINE NAVIGATION SERVICE IN WIRELESS COMMUNICATION NETWORK

(75) Inventor: Toshihiko Muramatsu, Iwata-gun (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/145,839

(22) Filed: May 14, 2002

(65) Prior Publication Data

US 2002/0173906 A1 Nov. 21, 2002

(30) Foreign Application Priority Data

May 15, 2001 (JP) ..................................... P2001-145484

(51) Int. Cl.⁷ ............................ G01C 21/00; G01S 3/02
(52) U.S. Cl. ................... 701/211; 701/213; 342/357.09
(58) Field of Search ................. 701/208, 211, 701/213, 201; 340/995.12, 995.24, 995.27; 342/357.08, 357.09, 357.1

(56) References Cited

U.S. PATENT DOCUMENTS

| | | | | | |
|---|---|---|---|---|---|
| 5,307,074 A | * | 4/1994 | Janex | ........................... | 342/41 |
| 5,745,866 A | * | 4/1998 | Steiner | ........................ | 701/200 |
| 6,133,853 A | * | 10/2000 | Obradovich et al. | ........ | 340/905 |
| 6,266,615 B1 | * | 7/2001 | Jin | ............................. | 701/213 |
| 6,314,365 B1 | * | 11/2001 | Smith | ........................ | 701/200 |
| 6,353,798 B1 | * | 3/2002 | Green et al. | ................. | 701/213 |
| 6,366,782 B1 | * | 4/2002 | Fumarolo et al. | ........... | 455/457 |
| 6,366,856 B1 | * | 4/2002 | Johnson | ....................... | 701/213 |
| 6,430,498 B1 | * | 8/2002 | Maruyama et al. | ......... | 701/200 |
| 6,490,521 B2 | * | 12/2002 | Wiener | ....................... | 701/211 |
| 6,519,466 B2 | * | 2/2003 | Pande et al. | ............. | 455/456.1 |
| 6,735,520 B2 | * | 5/2004 | Nozaki | ....................... | 701/211 |
| 2003/0016804 A1 | * | 1/2003 | Sheha et al. | ........... | 379/201.06 |

FOREIGN PATENT DOCUMENTS

| | | |
|---|---|---|
| JP | 07-031970 | 4/1995 |
| JP | 07-270174 | 10/1995 |
| JP | 08-005394 | 1/1996 |
| JP | 2001-5974 | * 3/2001 |
| JP | 2002-108194 | 4/2002 |

* cited by examiner

Primary Examiner—Michael J. Zanelli
(74) Attorney, Agent, or Firm—Pillsbury Winthrop LLP

(57) ABSTRACT

A portable communication device comprises a GPS module for determining the present position, an electronic compass module for detecting an azimuth, a display, and a wireless communicator. Herein, the position information representing the destination and present position is transmitted towards the navigation server, which in turn provides the map information including the destination and present position, based on which corresponding icon symbols are indicated in the map displayed on the screen. In addition, the azimuth is also indicated by an angle departing from a north direction of the map information. Specifically, an azimuthal arrow symbol is displayed in proximity to the icon symbol representing the present position in the map, or the icon symbol is inclined by the aforementioned angle. Thus, it is possible to create images for navigation that are appropriately displayed on the screen and are recognizable in viewing without using expensive graphic processing.

17 Claims, 16 Drawing Sheets

FIG. 2

| AREA TOKYO CHUO-KU | | | | | | | |
|---|---|---|---|---|---|---|---|
| CLASSIFICATION | NAME | TELEPHONE NUMBER | URL | LATITUDE | LONGITUDE | ICON ON DISPLAY | |
| SHOP | Apple | 03-1234-0000 | www.apple.co.jp | 36.14N | 140.11E | ICON 1 | ⊕ |
| | Beattles | 03-1234-0001 | www.beattle.co.jp | 31.25N | 130.53E | ICON 2 | △ |
| | Casa | 03-1234-0002 | www.casa.co.jp | 43.55N | 144.12E | ICON 3 | |
| RESTAURANT | AI | 03-2345-0000 | www.ai.co.jp | 38.67N | 135.64E | ICON 11 | |
| | Bean | 03-2345-0001 | www.bean.co.jp | 39.41N | 134.41E | ICON 12 | |
| | Candy | 03-2345-0002 | www.candy.co.jp | 40.55N | 130.40E | ICON 13 | |
| COMPANY | AOI Corp | 03-3456-0000 | www.aoi.co.jp | 38.67N | 135.64E | ICON 21 | |
| | BS Inc | 03-3456-0001 | www.bs.co.jp | 33.79N | 133.37E | ICON 22 | |
| | Soda Comp | 03-3456-0002 | www.soda.co.jp | 30.79N | 132.56E | ICON 23 | |

FIG. 4
| ICON TYPE | ICON SYMBOL |
|---|---|
| ICON A |  |
| ICON B | 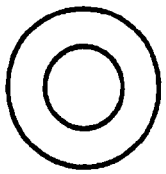 |
| ICON C | 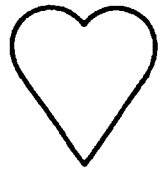 |

FIG. 5
| AZIMUTHAL RANGE | AZIMUTHAL ARROW DATA | AZIMUTHAL ARROW SYMBOL |
|---|---|---|
| 345° ≦ Θ < 15° | Deg 0 |  |
| 15° ≦ Θ < 45° | Deg 30 |  |
| 45° ≦ Θ < 75° | Deg 60 |  |
| 75° ≦ Θ < 105° | Deg 90 |  |
| 105° ≦ Θ < 135° | Deg 120 |  |
| 135° ≦ Θ < 165° | Deg 150 |  |
| 165° ≦ Θ < 195° | Deg 180 |  |
| 195° ≦ Θ < 225° | Deg 210 |  |
| 225° ≦ Θ < 255° | Deg 240 |  |
| 255° ≦ Θ < 285° | Deg 270 |  |
| 285° ≦ Θ < 315° | Deg 300 |  |
| 315° ≦ Θ < 345° | Deg 330 |  |

FIG.6

ICON TABLE

| (1) ICON TYPE | (2) NAME | (3) CELLULAR PHONE NUMBER | (4) LATITUDE | (5) LONGITUDE | (6) AZIMUTH |
|---|---|---|---|---|---|
| ICON A | Toshi Muramatsu | 090-1234-5678 | 36.14N | 140.11E | 47° |

FIG.16

ICON TABLE

| | (1) C1 | (2) C2 | (3) C3 | (4) C4 | (5) C5 | (6) C6 |
|---|---|---|---|---|---|---|
| | ICON TYPE | PERSONAL NAME | CELLULAR PHONE NUMBER | LATITUDE | LONGITUDE | AZIMUTH |
| R1 | ICON 1 Toshi | Toshi Muramatsu | 090-1234-0000 | 36.14N | 140.11E | 80° |
| R2 | ICON 2 Masa | Masa Yamaha | 090-1234-0001 | 31.25N | 130.53E | 120° |
| R3 | ICON 3 Taka | Taka Nomura | 090-1234-0002 | 43.55N | 144.12E | 175° |
| R10 | ICON 10 Tom | Tom Yamada | 090-1234-0010 | 38.67N | 135.64E | 40° |

PORTABLE NAVIGATION DEVICE AND SYSTEM, AND ONLINE NAVIGATION SERVICE IN WIRELESS COMMUNICATION NETWORK

BACKGROUND OF THE INVENTION

1. Field of the Invention

This invention relates to portable navigation devices and systems, and online navigation services in wireless communication systems. Specifically, this invention relates to portable communication devices such as cellular phones having navigation functions, navigation servers for providing online navigation services, and navigation systems for providing online navigation services as requested by portable communication devices connected with networks in wireless communications.

2. Description of the Related Art

Conventionally, so-called map information services are known as a typical example of navigation services, which are provided online via networks. That is, when the user who has a prescribed contract for receiving a certain navigation service operates a portable communication device such as a cellular phone to designate an item of 'map' on the screen, the prescribed server or service station sends corresponding map data to the portable communication device.

Recently, various types of navigation devices are developed and sold on the market. A typical example of the navigation device contains a GPS receiver (where 'GPS' stands for 'Global Positioning System') and provides communication functions via networks. Hence, the user of the navigation device is able to confirm his/her present position on the map that is downloaded thereto.

Japanese Unexamined Patent Publication No. Hei 7-91970 discloses a portable navigation device that contains a GPS device and an electronic compass, wherein the map displayed on the screen is rotated in such a way that its azimuth substantially matches the azimuth detected by the electronic compass. This publication discloses two types of processing for rotating the map on the screen. That is, the map is rotated on the screen by image processing, or the display is mechanically rotated by itself.

The conventional map information service does not provide indications of the destination and present position with respect to the portable communication device. Hence, the user of the portable communication device is unable to confirm his/her present position and destination on the map displayed on the screen. Therefore, it cannot be used as a guide or guidance for the user of the portable communication device.

The user of the navigation device having a communication function, which was actually sold on the market, may be able to confirm his/her present position and destination on the map displayed on the screen. However, the navigation device does not provide a function of notifying the user of his/her direction, i.e., azimuth thereof Therefore, the user should make some efforts to rotate the device with reference to an appropriate (land) mark and to establish an azimuth match.

In the above, the user would easily make a mistake in establishing an azimuth match, and it may take a long time for the user to determine the optimal path towards the destination. In addition, the conventional navigation devices may be difficult to operate and cause problems in manual operations for users of a certain age. Further, the conventional navigation devices require the users to change directions thereof and to establish azimuth matches prior to actual uses. Hence, it may be difficult for the users to properly hold the navigation devices and to view the screens.

The portable navigation device disclosed by the aforementioned publication requires complicated graphic processing, which may be expensive, in order to electronically ensure rotation of the map displayed on the screen by the prescribed image processing. In addition, it requires a complicated mechanism, which may be expensive, in order to ensure mechanical rotation of the display.

SUMMARY OF THE INVENTION

It is an object of the invention to provide a portable communication device that is easy to operate for users of all ages and that can display a clear and recognizable navigation image on the screen without using 'expensive' graphic processing. Herein, the portable communication device having a navigation function is applicable to navigation systems, in particular, wireless communication networks incorporating servers for providing online navigation services.

A portable communication device such as a cellular phone has a connectibility with a navigation server for providing a prescribed navigation service online as requested over a network. The portable communication device of this invention comprises a GPS module for receiving signals from GPS satellites to determine the present position, which can be two-dimensionally defined using the latitude and longitude, an electronic compass module for detecting an azimuth, a display for displaying various data on the screen, and a wireless communicator. It is characterized by unique navigation display controls in association with the navigation server over the network such as the Internet. That is, the portable communication device transmits position information representing the destination and present position to the navigation server by the wireless communicator, and then it receives and downloads from the navigation server the map information including the destination and present position, based on which icon symbols representing the destination and present position are respectively indicated in the map displayed on the screen. In addition, the azimuth is also indicated by an angle departing from a north direction of the map information. Specifically, the azimuth is indicated by displaying an azimuthal arrow symbol in proximity to the icon symbol representing the present position in the map, wherein an appropriate azimuthal arrow symbol is selected from among a plurality of azimuthal arrow symbols, which are allocated to a plurality of azimuthal ranges respectively. Alternatively, the azimuth is indicated by inclining the icon symbol representing the present position by the angle departing from the north direction of the map information.

Thus, it is possible to create images for navigation that are appropriately displayed on the screen and are recognizable in viewing without using expensive graphic processing. Hence, users of all ages are able to easily handle and operate navigation functions on the portable communication device.

BRIEF DESCRIPTION OF THE DRAWINGS

These and other objects, aspects, and embodiments of the present invention will be described in more detail with reference to the following drawing figures, in which:

FIG. 2 shows an example of a list of destination data that are registered with a destination server connected with a navigation server shown in FIG. 1;

FIG. 4 shows examples of icon symbols displayed on the screen;

FIG. 5 shows examples of azimuthal arrow data representing azimuthal arrow symbols displayed on the screen;

FIG. 6 shows an example of the content of an icon table that is stored in a RAM of the cellular phone;

FIG. 16 shows an example of the content of the icon table that is set in the RAM of the cellular phone.

DESCRIPTION OF THE PREFERRED EMBODIMENT

This invention will be described in further detail by way of examples with reference to the accompanying drawings.

Figure 1:
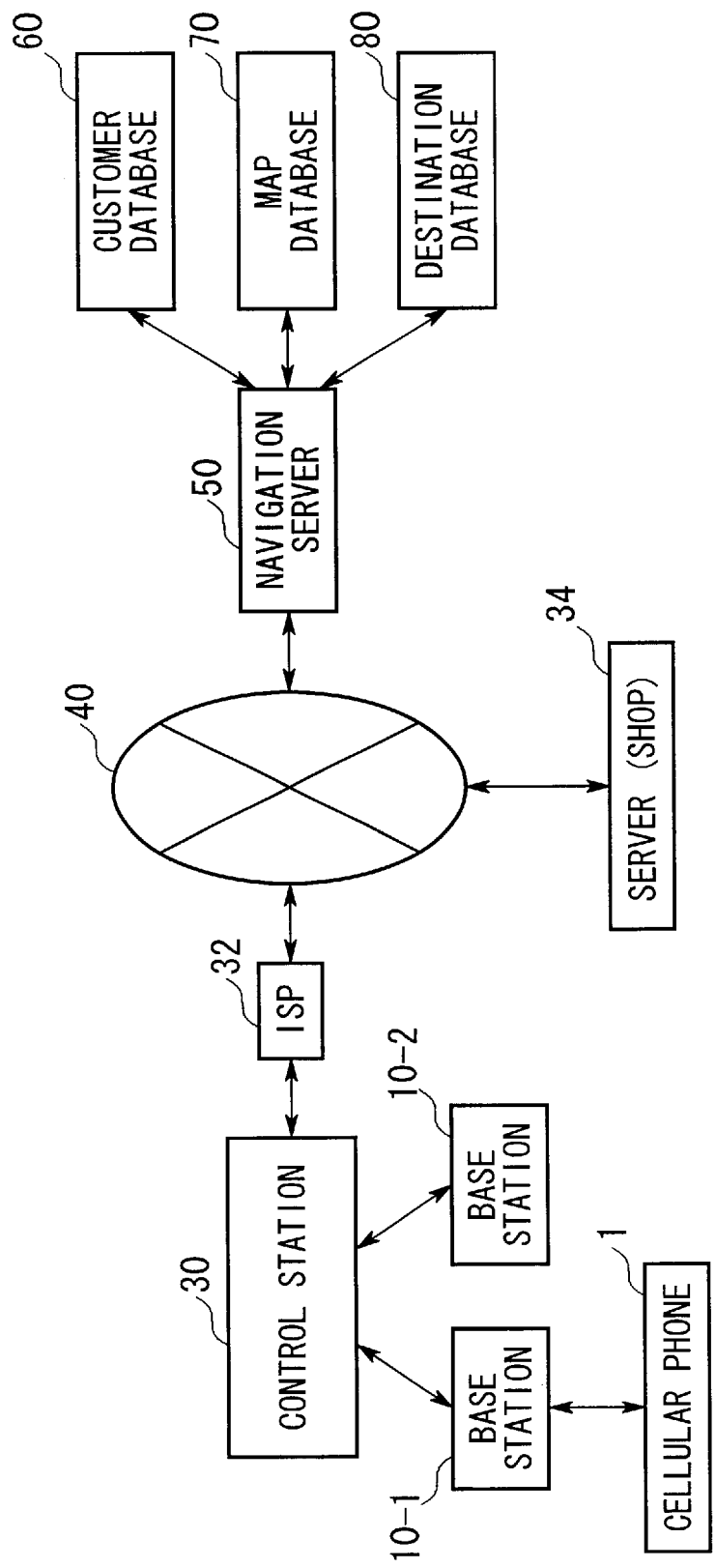
FIG. 1 is a block diagram showing the overall configuration of a navigation system in accordance with a preferred embodiment of the invention.

FIG. 1 shows the configuration of an overall navigation system in accordance with the preferred embodiment of the invention.

The navigation system shown in FIG. 1 employs a cellular phone (or portable telephone) as an example of a portable communication device, which can be constituted as a personal computer, notebook computer, PDA terminal ('PDA' stands for 'Personal Digital Assistant'), and the like.

In the navigation system of FIG. 1, a cellular phone 1 issues a navigation request via the Internet '40', by which a navigation server 50 provides a prescribed navigation service. The navigation server 50 is facilitated in the prescribed positional information center for providing position information as requested. In addition, the navigation server 50 also provides various functions as a GPS station.

The GPS station performs measurement (triangulation) calculations based on prescribed signals (or data) from GPS satellites, wherein the data of the GPS satellites are originally received by the cellular phone 1 (or mobile station), from which they are transmitted to the GPS station. Then, the GPS station sends calculation results back to the cellular phone 1. Herein, the GPS station can employ the D-GPS system (where 'D' stands for 'Differential'), wherein it sends error correction data to the mobile station performing measurement calculations to correct errors. Alternatively, the GPS station employs the E-GPS system (where 'E' stands for 'Enhanced'), wherein it performs measurement calculations based on the signals of GPS satellites originally received by the mobile station, so that calculation results are sent back to the mobile station. If the mobile station has a capability of accurately determining the position thereof to some extent, there is no need to provide a GPS station for the mobile station (e.g., cellular phone 1).

The cellular phone 1 communicates with one of base stations 10-1, 10-2, ..., which are provided in the prescribed service area, wherein these base stations are pivotally managed under the control of a control station 30.

The control station 30 is connected with the Internet 40 via an Internet Service Provider (ISP) 32.

The navigation server 50 is connected with the Internet 40, wherein it provides connections with various sites, namely, a customer database 60, a map database 70, and a destination database 80. A server 34 that is provided in the prescribed shop and the like is also connected with the Internet 40.

The customer database 60 stores in advance customer data (e.g., names and telephone numbers of customers) for specifying customers who have had contracts to receive navigation services. The map database 70 stores in advance map data that represent a variety of maps.

The destination database 80 stores in advance destination data (e.g., names of shops, their latitude and longitude information, etc.) for specifying destinations, which may be designated by the cellular phone 1.

FIG. 2 shows an example of a list of destination data that are registered with the destination database 80. Each list is provided for each area, for example, 'Tokyo Chuo-ku' area in case of FIG. 2. The destination data provide 'fixed' information data such as 'classification', 'name', 'telephone number', and 'URL (Uniform Resource Locator)'. Destinations are classified into shops, restaurants, and companies in case of FIG. 2. In addition, there are also provided other information data such as 'latitude' and 'longitude' of each destination as well as icon data displayed on the screen. As the icon data, prescribed combinations of icon codes and icon symbols are registered. The icon codes are denoted as 'icon 1', 'icon 2', ..., in FIG. 2.

The navigation server 50 receives from the cellular phone 1 its customer data, present position data, and signals of GPS satellites to provide the following functions.

(1) To make a confirmation (or decision) as to whether or not the customer data (e.g., subscriber's telephone number) specifying the user of the cellular phone 1 is registered with the customer database 60.

(2) To create a map including the present position of the cellular phone 1 based on the present position data (i.e., latitude and longitude information) given from the cellular phone 1 in accordance with map data, or to create a map including the present position of the cellular phone 1 and the position of the prescribed shop, which is determined based on the latitude and longitude information of the prescribed shop (or destination) retrieved from the destination database 80.

(3) To perform measurement calculations based on the signals of GPS satellites and to transmit calculation results to the cellular phone 1 (or mobile station).

Figure 3:
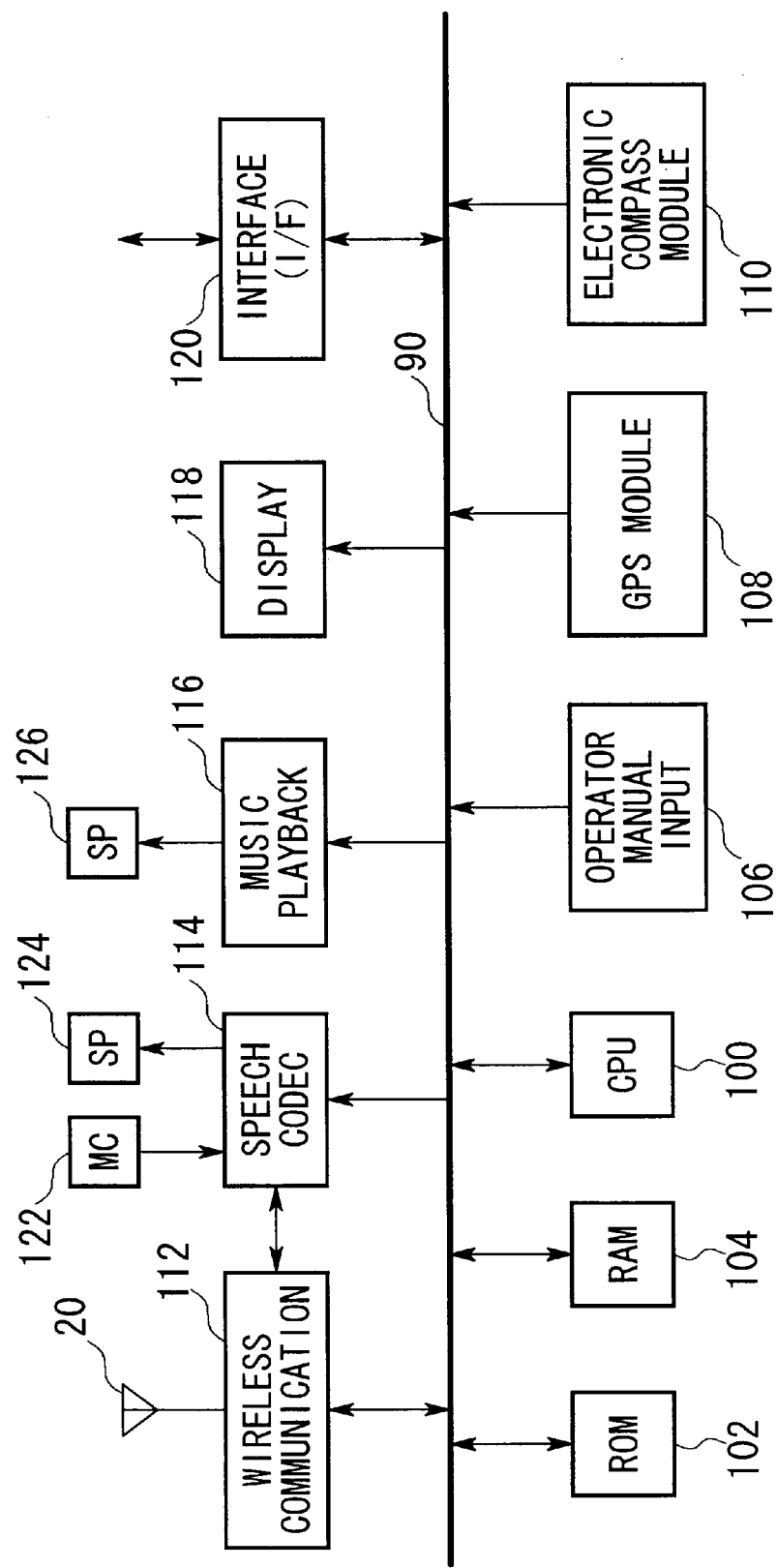
FIG. 3 is a block diagram showing the internal configuration of a cellular phone shown in FIG. 1.

FIG. 3 shows the internal configuration of the cellular phone 1 shown in FIG. 1. The cellular phone 1 of FIG. 3 comprises a CPU 100, a ROM 102, a RAM 104, an operator manual input section 106, a GPS module 108, an electronic compass module 110, a wireless communication section 112, a speech CODEC (i.e., coder-decoder) 114, a music playback section 116, a display 118, an interface (I/F) 120, a microphone (MC) 122, an earpiece speaker 124, and an incoming call speaker 126. The ROM 102 stores in advance various kinds of programs and fixed data. The CPU 100 executes programs to control various sections and blocks of the cellular phone 1, thus providing telephone functions as well as functions as the game device and music player.

Specifically, the ROM 102 stores fixed data such as music data representing incoming call melodies, and application programs for the game software in addition to the aforementioned programs. In addition, the ROM 102 also stores icon data, azimuthal arrow data, and other fixed data. The icon data (see FIG. 4) represent icon symbols (or icon characters), which are displayed on the screen to provide personal position information for the user of the cellular phone 1. The azimuthal arrow data (see FIG. 5) represent azimuthal directions, which are displayed on the screen in proximity to the icon symbols (see FIG. 7).

As the icon symbols, the ROM 2 stores 'icon A', 'icon B', and 'icon C', each of which can be used as a representation of the present position of the cellular phone 1, for example.

As shown in FIG. 5, the complete azimuthal range of 360° is divided into twelve angular ranges each including 30°. These angular ranges are registered with the ROM 102 as twelve azimuthal arrow data, namely, Deg 0, Deg 30, Deg 60, Deg 90, Deg 120, Deg 150, Deg 180, Deg 210, Deg 240, Deg 270, Deg 300, and Deg 330. Specifically, the azimuthal arrow data provide the following angular ranges respectively.

Deg 0: $345° \leq \theta < 15°$

Deg 30: $15° \leq \theta < 45°$

Deg 60: $45° \leq \theta < 75°$

Deg 90: $75° \leq \theta < 105°$

Deg 120: $105° \leq \theta < 135°$

Deg 150: $135° \leq \theta < 165°$

Deg 180: $165° \leq \theta < 195°$

Deg 210: $195° \leq \theta < 225°$

Deg 240: $225° \leq \theta < 255°$

Deg 270: $255° \leq \theta < 285°$

Deg 300: $285° \leq \theta < 315°$

Deg 330: $315° \leq \theta < 345°$

Therefore, twelve azimuthal arrow symbols, each of which is revolved in a clockwise direction by 30°, are provided to represent the aforementioned twelve azimuthal arrow data respectively.

The RAM 104 stores various data, which are downloaded to the cellular phone 1 via the Internet 40, as well as various music data which are input from the external audio device and the like. The RAM 104 provides an icon table (see FIG. 6), having columns (1)–(6), which stores personal data (e.g., name) for specifying individual persons, phone data (e.g., telephone number) for specifying telephones of individual persons, and position information (e.g., GPS position information) of these telephones in relation to arbitrary icon symbols. In addition, the RAM 104 also provides a user setup data storage area, and a work area for the CPU 100.

The operator manual input section 106 provides a start key and an end key that are used to start and end a conversation or telephone communication, numeric keys, cursor keys, function keys, and a power key.

The GPS module 108 receives from three or more GPS satellites the prescribed signals for use in measurement of positioning, so that it sends data representing the received signals to the GPS station, which in turn performs measurement calculations. Then, calculation results produced by the GPS station are sent back to the cellular phone 1, in which they are stored in the prescribed area of the RAM 104 to update its content under the control of the GPS module 108.

The electronic compass 110 detects the azimuth of the cellular phone 1 by itself every prescribed time period, thus producing azimuth data. Alternatively, the electronic compass 110 normally detects the azimuth of the cellular phone 1 by itself, thus producing azimuth data. The azimuth data are stored in the prescribed area of the RAM 104 to update its content under the control of the electronic module 110.

The wireless communication section 112 receives signals via an antenna 20 and modulates them. In addition, the wireless communication section 112 modulates signals and transmits them in the air via the antenna 20.

The speech CODEC 114 decodes speech signals from the wireless communication section 112, so that the decoded speech signals are supplied to the earpiece speaker 124. In addition, the speech CODEC 114 performs compressive coding on speech signals that are picked up by the microphone 122, so that the compressed speech signals are supplied to the wireless communication section 112.

The music playback section 116 supplies the speaker 126 with an incoming call melody, which is used to notify the user of a reception of an incoming call. Alternatively, the music playback section 116 plays back the music data stored in the ROM 102 or the RAM 104, so that the speaker 126 produces the corresponding incoming call melody.

The display 118 displays various kinds of data including map information on the screen. The display 118 is constituted as a liquid crystal display (LCD), for example. The interface 120 provides an input terminal (not shown) by which the cellular phone 1 is connected with an external audio device (not shown). Thus, the cellular phone 1 is capable of receiving from the external audio device the prescribed music data, which are then stored in the RAM 104.

The cellular phone 1 provides a bus 90 that mutually connects together the CPU 100, ROM 102, RAM 104, operator manual input section 106, GPS module 108, electronic compass module 110, wireless communication section 112, speech CODEC 114, music playback section 116, display 118, and interface 120.

Figure 8:
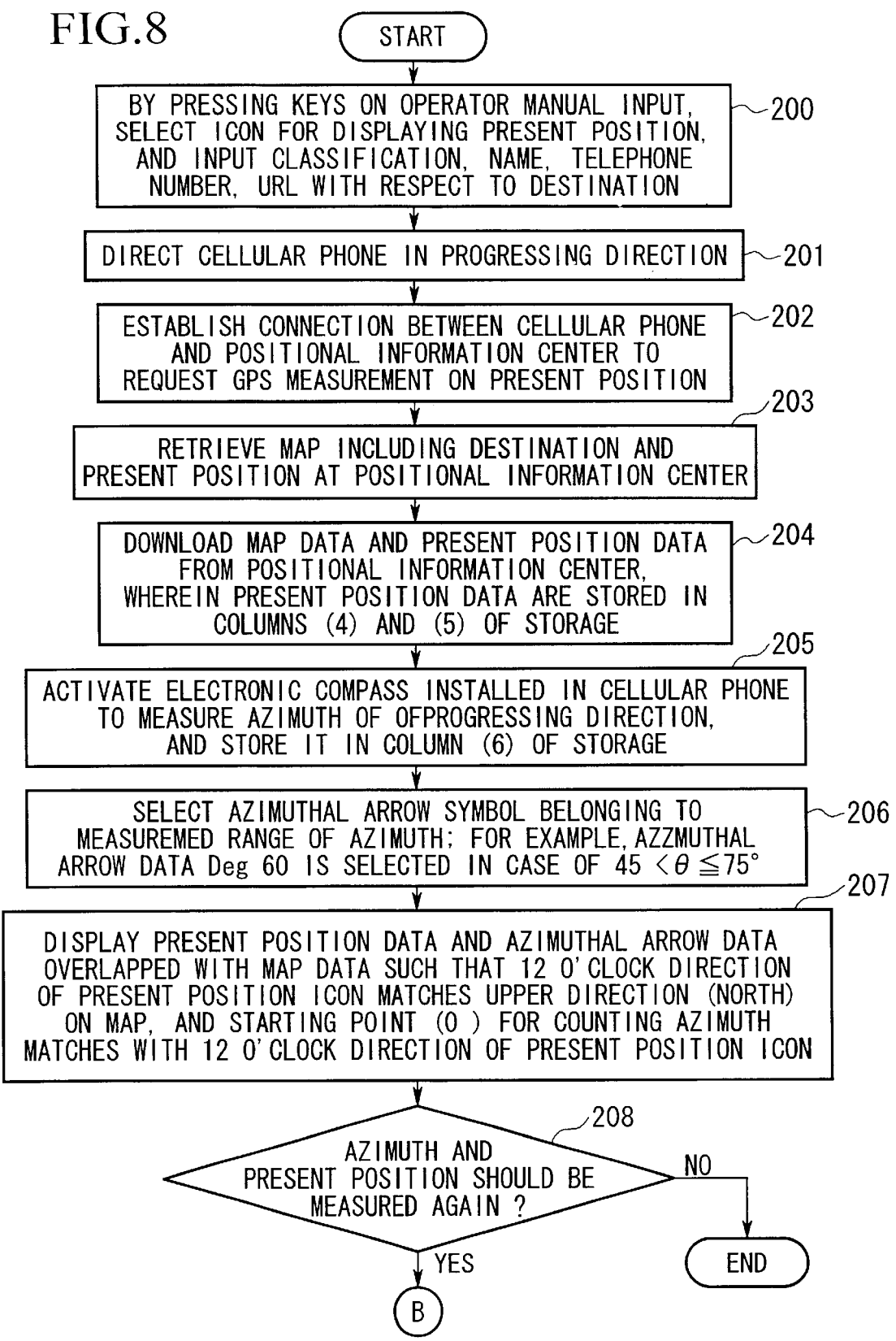
FIG. 8 is a flowchart showing a first part of a navigation process executed by the cellular phone.
Figure 9:
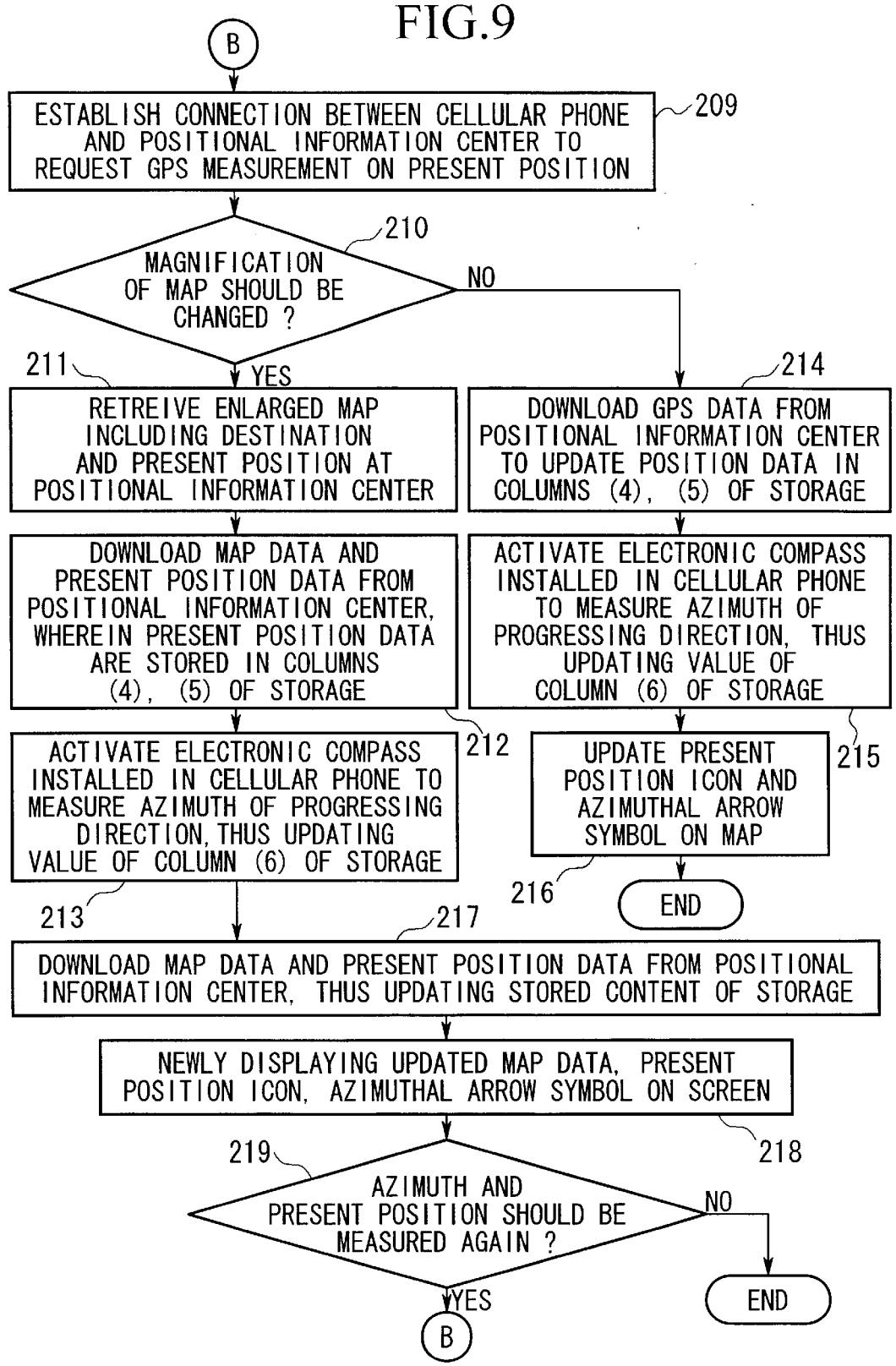
FIG. 9 is a flowchart showing a second part of the navigation process executed by the cellular phone.

Next, the overall operation of the aforementioned navigation system will be described with reference to flowcharts shown in FIGS. 8 and 9. That is, the cellular phone 1 starts to perform a navigation process shown in FIGS. 8 and 9 upon manual operation of keys. In step 200, the user operates keys of the operator manual input section 106 to select a desired icon symbol that is displayed on the screen to indicate the present position of the cellular phone 1. In addition, the user also operates keys of the operator manual input section 106 to designate a destination by specifying its classification, name, telephone number, or URL. For example, when the user operates the operator manual input section 106 to select 'icon A' shown in FIG. 4 or FIG. 6, the icon A is entitled in the icon type (1) of the icon table in the RAM 104 (see FIG. 6).

Then, the user holds and turns the cellular phone 1 in his/her progressing direction in step 201. In step 202, the user operates the cellular phone 1 to make an access to the navigation server 50 facilitated in the positional information center to request it to perform measurement calculation processing based on measurement results produced by the GPS module 108. Herein, the cellular phone 1 activates the GPS module 108 to provide position information (i.e., latitude and longitude information) representing the present position of the cellular phone 1.

Concretely speaking, the GPS module 108 receives from three or more GPS satellites the prescribed signals for positional measurement, so that the corresponding data are transmitted to the navigation server 50 of the positional information center. Then, the GPS module 108 receives from the navigation server 50 measurement calculation results, based on which the position information (latitude and longitude information) representing the present position of the cellular phone 1 can be obtained.

Upon receipt of the prescribed signals from the cellular phone 1, the navigation server 50 retrieves from the map database 70 the map information including the destination and present position of the cellular phone 1 in step 203.

In step 204, the cellular phone 1 downloads from the navigation server 50 the map information including the destination and present position thereof as well as the position information (latitude and longitude information) representing the present position thereof In the cellular phone 1, the map information is stored in the prescribed area of the RAM 104, while the position information is stored in the columns (4) and (5) of the icon table (see FIG. 6) of the RAM 104. Every time new information data are downloaded to and stored in the cellular phone 1, the aforementioned contents of the RAM 104 are updated.

In step 205, the cellular phone 1 activates the electronic compass module 110 to detect the azimuth thereof, thus producing azimuth data. The azimuth data are stored in the column (6) of the icon table (see FIG. 6) of the RAM 104. In step 206, azimuthal arrow data is selected in correspondence with the azimuthal range which the detected azimuth belongs to and is selected from the ROM 102.

For example, when the detected azimuth belongs to the azimuthal range of $45° \leq \theta < 75°$, the azimuthal arrow data 'Deg 60' is correspondingly selected and is read from the ROM 102.

Figure 7:
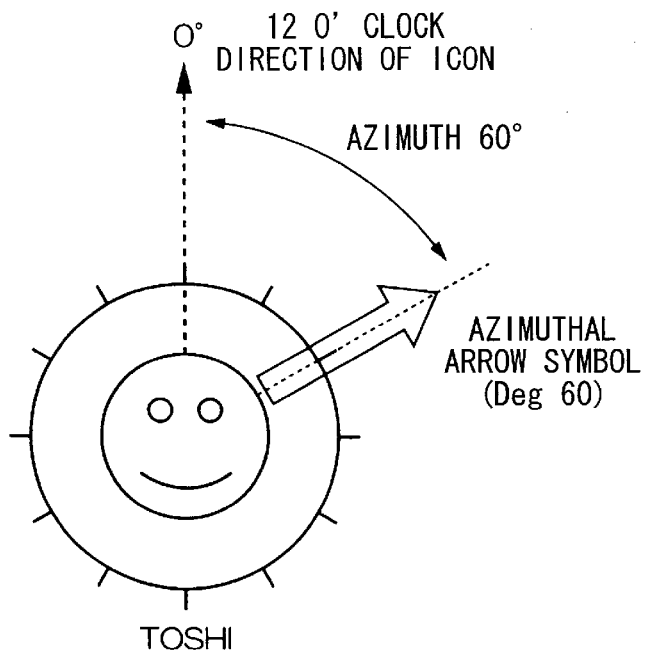
FIG. 7 shows an example of an icon symbol that is displayed together with an azimuthal arrow symbol on the screen.

In step 207, the cellular phone 1 displays on the screen of the display 118 the icon symbol representing the present position and the azimuthal arrow data representing the azimuth thereof, which are being overlapped with the map information representing the map including the destination and present position of the cellular phone 1. At this time, the icon symbol representing the present position of the cellular phone 1 is displayed in such a way that the 12 o'clock direction thereof matches the upper direction (designating north) on the map, while the azimuthal arrow data is displayed in such a way that the starting point (0°) for counting the azimuth matches the 12 o'clock direction of the icon symbol. FIG. 7 shows an example of an image that is displayed on the screen, wherein the azimuthal arrow data Deg 60 (e.g., 60°) is counted from the 12 o'clock direction and is displayed in proximity to the icon symbol.

In step 208, a decision is made as to whether or not the azimuth and present position of the cellular phone 1 should be measured again. If the decision result is 'NO', the CPU 100 ends the navigation process of FIG. 8. When the CPU 100 determines that the azimuth and present position of the cellular phone 1 should be measured again, the flow proceeds to step 209 shown in FIG. 9, wherein the cellular phone 1 establishes a connection with the navigation server 50 to request measurement calculation processing based on measurement results of the GPS module 108.

In step 210, a decision is made as to whether or not magnification for displaying the map on the screen should be changed. If the CPU 100 determines that the magnification should not be changed, the flow proceeds to step 214, wherein the cellular phone 1 downloads from the navigation server 50 the position information (latitude and longitude information) representing the present position thereof. The position information is stored in the columns (4) and (5) of the RAM 104, thus the content of the RAM 104 being updated.

In step 215, the cellular phone 1 activates the electronic compass module 110 to detect the azimuth thereof, thus producing azimuth data. The azimuth data is stored in the column (6) of the icon table of the RAM 104, thus updating the content of the RAM 104.

In step 216, azimuthal arrow data is selected in correspondence with the azimuthal range which the detected azimuth belongs to and is read from the ROM 102. The selected azimuthal arrow data is displayed on the screen of the display 118 in proximity to the icon symbol representing the present position of the cellular phone 1.

When the CPU 100 determines that the magnification should be changed, the flow proceeds to step 211 in which the navigation server 50 retrieves enlarged map information including the destination and present position of the cellular phone 1. In step 212, the cellular phone 1 downloads from the navigation center 50 the enlarged map information including the destination and present position thereof as well as the position information (latitude and longitude information) representing the present position of the cellular phone 1. The position information is stored in columns (4) and (5) of the icon table of the RAM 104, thus updating the content of the RAM 104.

In step 213, the cellular phone 1 activates the electronic compass module 110 to detect the azimuth thereof, thus producing azimuth data. The azimuth data is stored in the column (6) of the icon table of the RAM 104, thus updating the content of the RAM 104.

After completion of the step 213, the flow proceeds to step 217 in which the cellular phone 1 downloads from the navigation center 50 the enlarged map information and the position information (latitude and longitude information) representing the present position thereof The position information is stored in the columns (4) and (5) of the icon table of the RAM 104, thus updating the content of the RAM 104.

Figure 10:
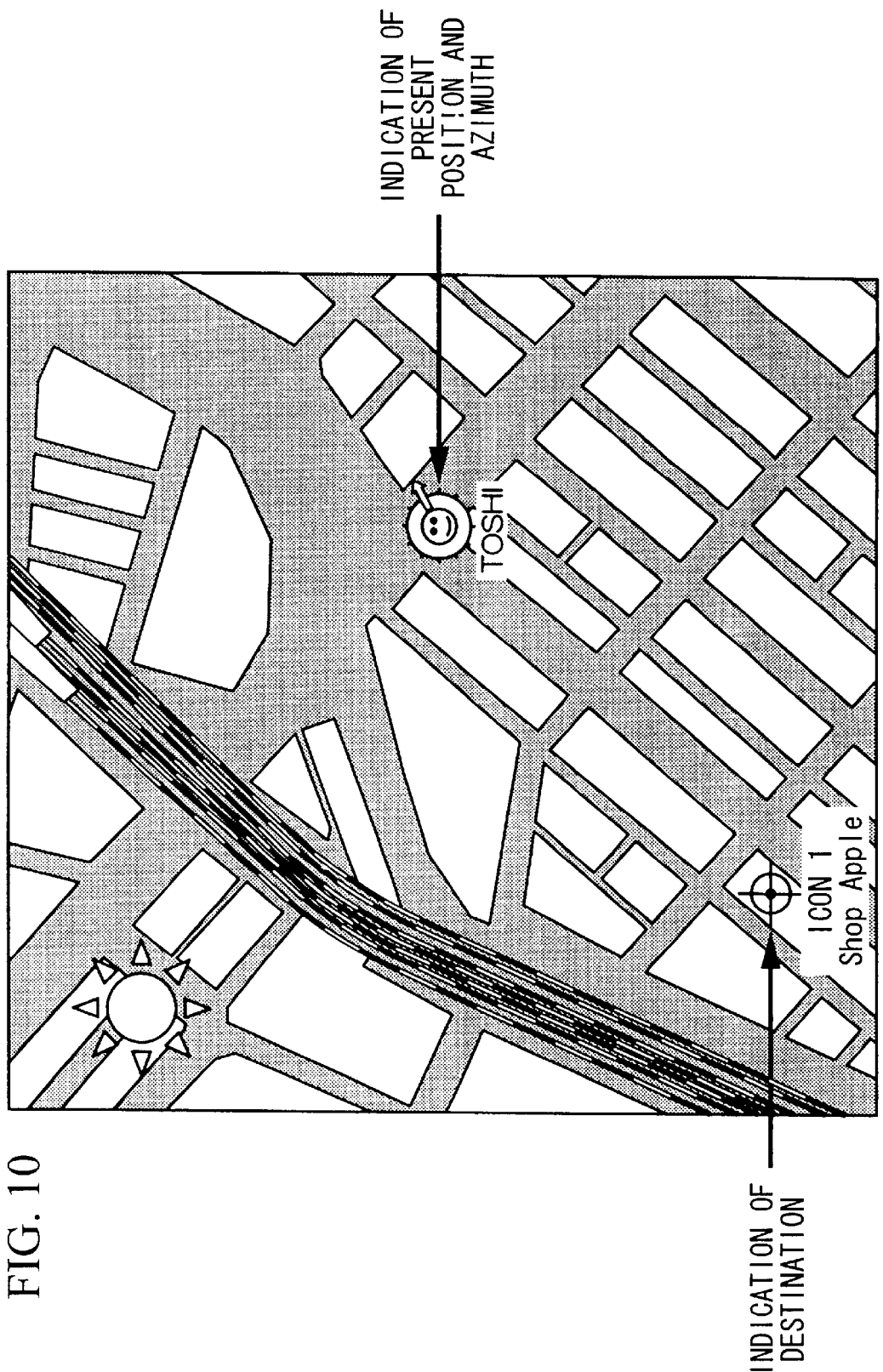
FIG. 10 shows an example of an image displayed on the screen in such a way that an icon symbol and an azimuthal arrow symbol are displayed together in relation to an indication of a destination on an enlarged map.

In step 218, the icon symbol representing the present position of the cellular phone 1 and the updated azimuthal arrow data are displayed together on the 'updated' map, which corresponds to the enlarged map information. FIG. 10 shows an example of an image, which is displayed on the screen in such a way that the icon symbol and the azimuthal arrow symbol are displayed together in relation to an indication of the destination on the enlarged map.

In step 219, a decision is made as to whether or not the azimuth and present position of the cellular phone 1 should be measured again. If the decision result is 'NO', the CPU 100 ends the navigation process of FIG. 9. When the decision result is 'YES', the flow returns to step 209 so that the aforementioned steps are repeated again.

The aforementioned navigation system can be modified in various manners. Next, a modified example of the navigation system will be described, whereas it is basically similar to the foregoing embodiment in the configurations shown in FIGS. 1 and 3. Herein, an important point of the modification lies in mutual communications between multiple portable communication devices such as cellular phones. That is, the cellular phone 1 provides a capability of obtaining the position information (latitude and longitude information) of the other cellular phone, which corresponds to the destination to communicate with. In addition, each cellular phone indicates the azimuth such that the icon symbol thereof is inclined in response to the azimuth. Other elements are identical to the aforementioned embodiment; hence, the duplicate description is omitted.

Figure 15:
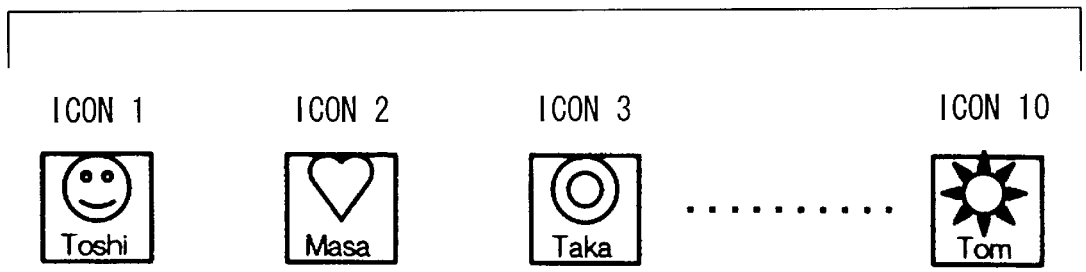
FIG. 15 shows examples of icon symbols that are set in connection with icon codes.
Figure 11:
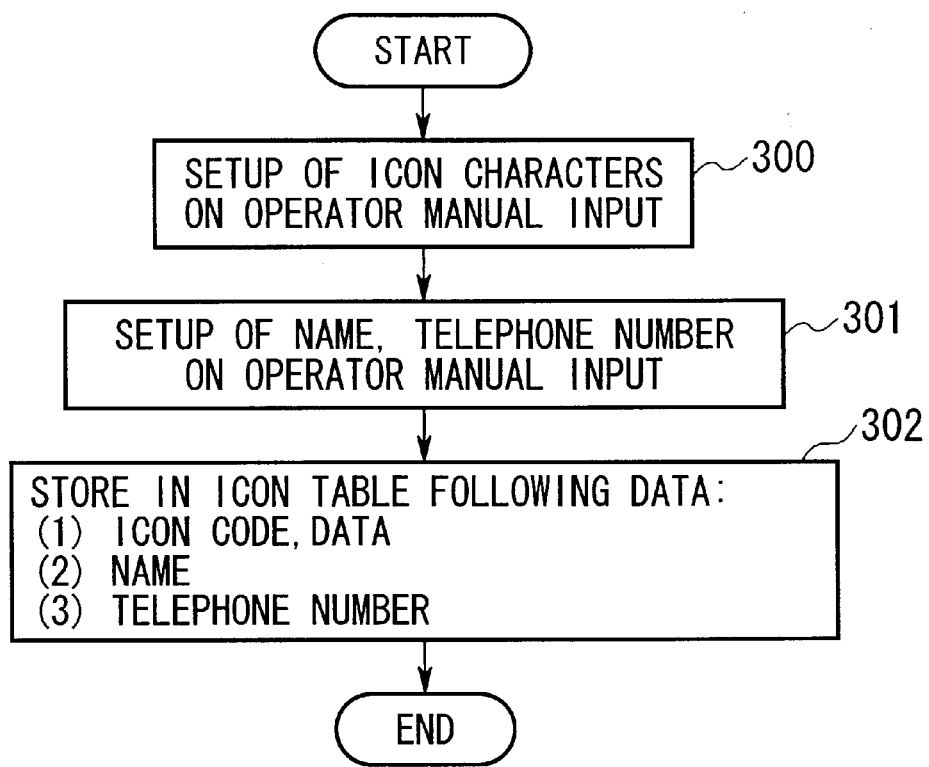
FIG. 11 is a flowchart showing an initial setup process for an icon table.

As described above, the navigation system of FIG. 1 is partially modified in such a way that the cellular phone 1 whose configuration is shown in FIG. 3 provides specific functions in displaying icon symbols on the screen, which will be described in detail with reference to flowcharts shown in FIGS. 11 to 14. FIG. 11 shows an initial setup process of the icon table stored in the RAM 104. In step 300, the user operates prescribed keys of the operator manual input section 106 to read icon data representing icon symbols (or icon characters) from the ROM 102, so that the icon symbols are displayed on the screen of the display 118. With respect to each of the icon symbols, the user inputs specific data specifying the personal individual of the cellular phone such as the nickname. FIG. 15 shows examples of icon symbols that are specified with nicknames, which are set in relation to icon codes such as 'icon 1', 'icon 2', 'icon 3', . . . , 'icon 10'.

In step 301, the user inputs detailed personal data such as the name of the personal individual and the telephone number of the cellular phone with respect to each of icon data.

In step 302, the aforementioned icon data together with the personal data are stored in the icon table of the RAM 104 (see FIG. 16).

In the initial setup process of FIG. 11, the icon table of the RAM 104 merely stores the icon code and icon data as well as the name of the personal individual and the telephone number of the cellular phone with respect to each icon symbol. In this stage, however, the icon table does not store the position information such as the latitude, longitude, and azimuth with respect to each icon symbol.

Figure 12:
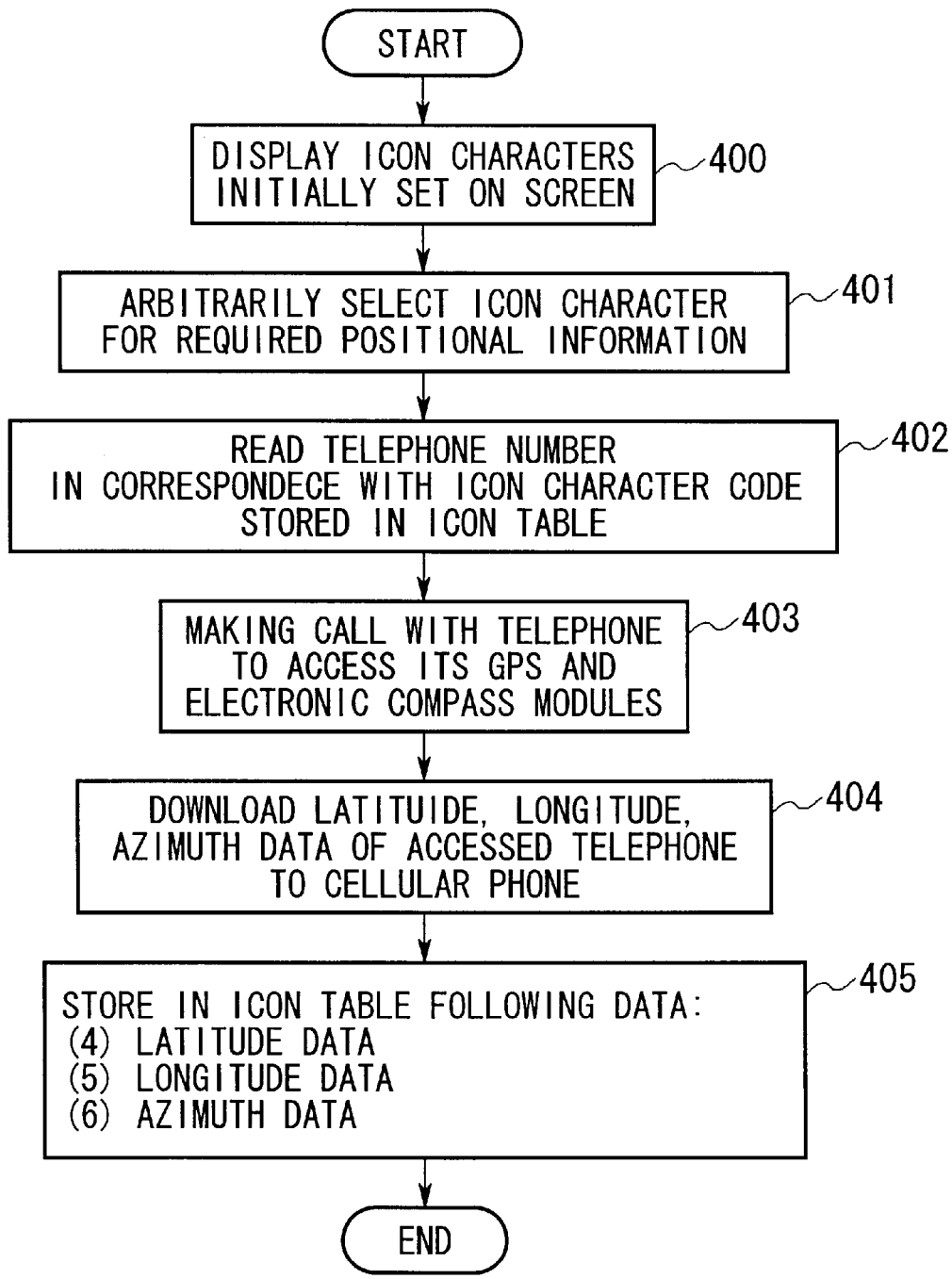
FIG. 12 is a flowchart showing a position information setup process for the icon table.
Figure 13:
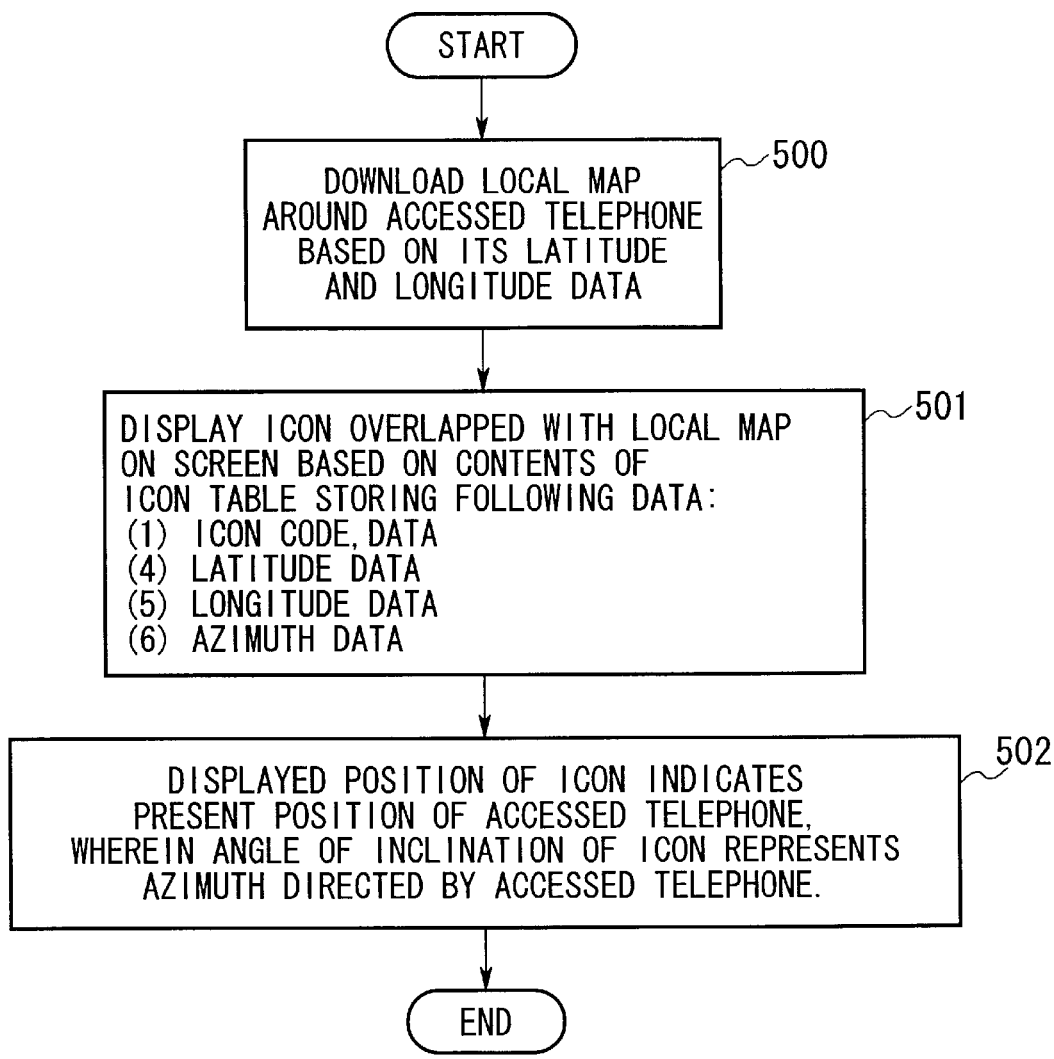
FIG. 13 is a flowchart showing an icon display process.
Figure 14:
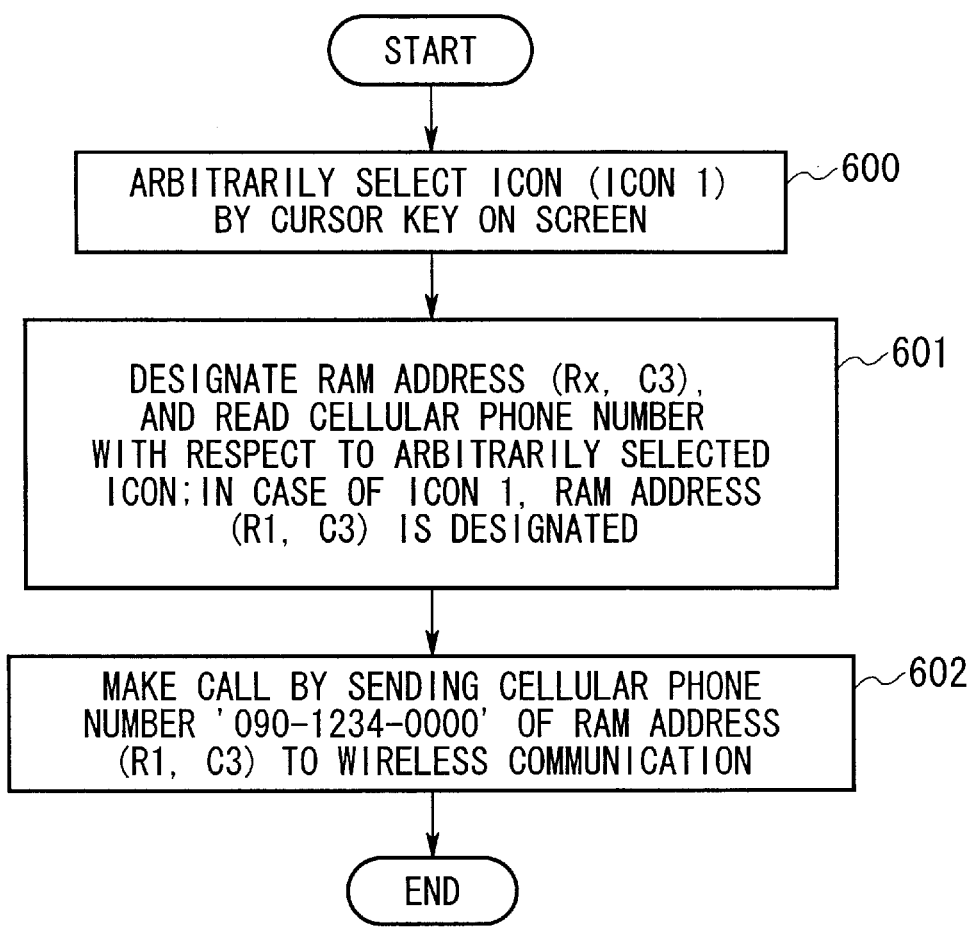
FIG. 14 is a flowchart showing a call process.

FIG. 12 shows a position information setup process for the icon table of the RAM 104. In step 400, the icon symbols that are set in the initial setup process of FIG. 11 are displayed on the screen of the display 118.

In step 401, the user operates the cursor key(s) of the operator manual input section 106 to arbitrarily select an icon symbol in correspondence with the specific individual whose position information is required.

In step 402, the telephone number that was set in advance with respect to the icon code corresponding to the arbitrarily selected icon symbol is automatically read from the icon table of the RAM 104. In step 403, the cellular phone 1 makes a call using the telephone number to establish a connection with the cellular phone that is owned by the specific individual designated by the arbitrarily selected icon symbol. That is, the cellular phone 1 accesses the other cellular phone to gain information data from its electronic compass module and GPS module.

In the above, the CPU 100 performs a call process to access the cellular phone of the personal individual, which is designated by the icon symbol arbitrarily selected from among plural icon symbols displayed on the screen of the display 118. Details of the call process will be described with reference to FIG. 14. Suppose that various icon symbols shown in FIG. 15 are displayed on the screen of the display 118 in relation to their icon codes. In step 600, the user operates the cursor key(s) of the operator manual input section 106 to arbitrarily select a desired icon symbol on the screen.

The aforementioned icon table shown in FIG. 16 has a matrix form consisting of rows and columns, wherein rows R1–R10 designate icon codes 'icon 1' to 'icon 10' respectively, and columns C1–C6 designate the prescribed items of the icon table, that is, 'icon type', 'personal name', 'cellular phone number', 'latitude', 'longitude', and 'azimuth'. Hence, the CPU 100 accesses the icon table in accordance with RAM addresses, each of which is defined by a pair of row and column.

In step 601, the CPU 100 designates a RAM address (Rx, C3) in correspondence with the icon code representing the selected icon symbol on the screen. Thus, the telephone number of the cellular phone of the designated personal individual is automatically read from the RAM 104 in accordance with the RAM address (Rx, C3). In the case of the icon symbol whose icon code is 'icon 1', for example, the CPU 100 designates a RAM address (R1, C3). In step 602, the prescribed telephone number (e.g., '090-1234-0000') is read from the icon table of the RAM 104 in accordance with the RAM address (R1, C3) and is sent to the wireless communication section 112. Thus, the cellular phone 1 automatically makes a call to establish a connection with the cellular phone of the designated personal individual.

Now, the description is back to the position information setup process of FIG. 12. In step 403, the cellular phone 1 accesses the electronic compass module and GPS module of the cellular phone of the personal individual designated by the selected icon symbol. Then, the flow proceeds to step 404 wherein the position information of the accessed cellular phone, which represents the latitude, longitude, and azimuth, is downloaded to the cellular phone 1.

In step 405, the downloaded position information (i.e., latitude, longitude, and azimuth) of the accessed cellular phone is stored in the icon table of the RAM 104 of the cellular phone 1.

The CPU 100 performs an icon display process to display an icon symbol of the specific personal individual at its position on the map displayed on the screen of the display 118 of the cellular phone 1. Details of the icon display process will be described with reference to FIG. 13. In step 500, the cellular phone 1 downloads from the GPS station or the positional information center, which provide positional information such as maps as required, the 'local' map including surrounding areas of the position of the other cellular phone owned by the specific personal individual on the basis of the position information representing the latitude, longitude, and azimuth of the other cellular phone, which was stored in the icon table of the RAM 104.

Figure 17:
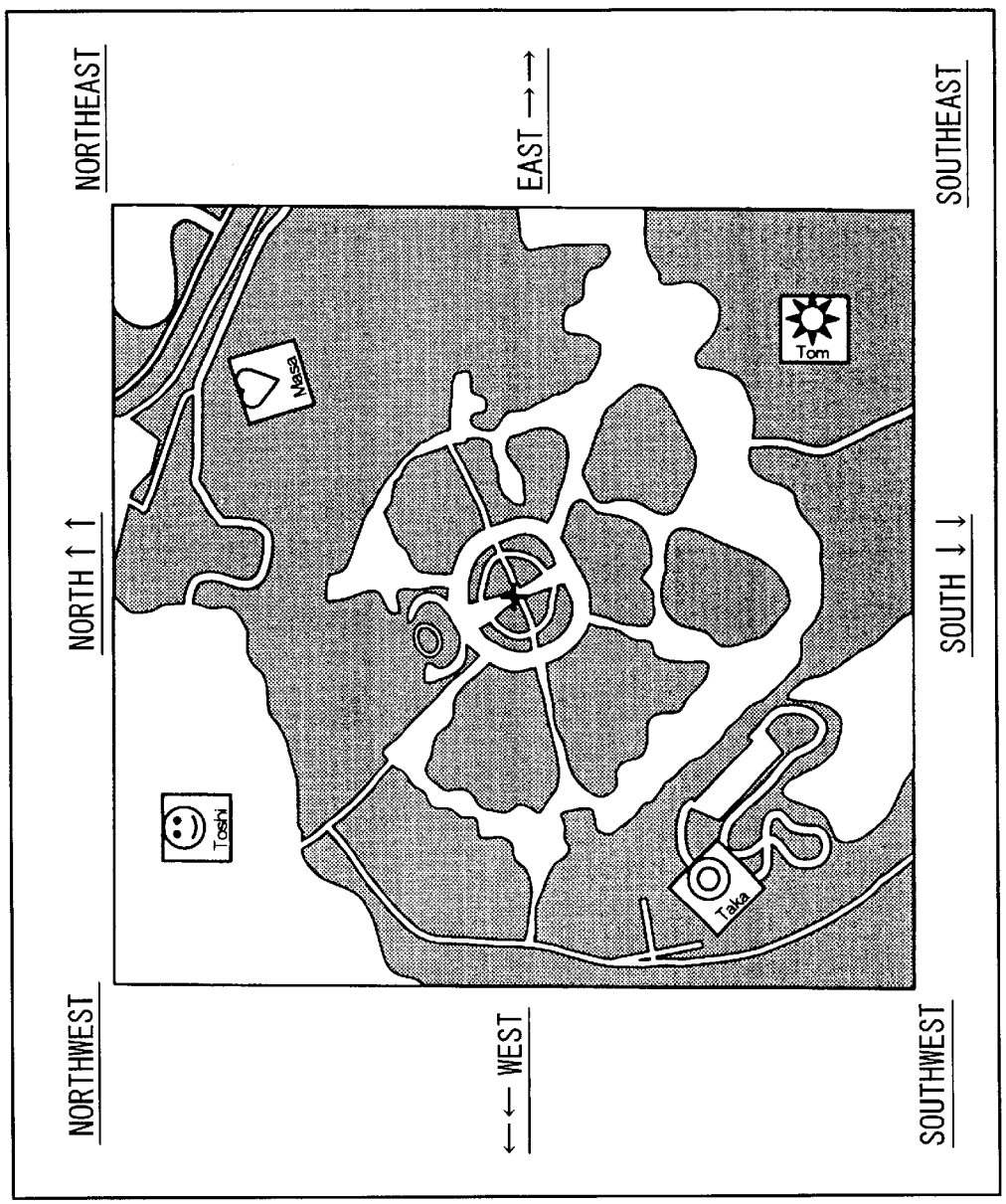
FIG. 17 shows an example of an image displayed on the screen such that icon symbols are each inclined and placed at different positions on the map.

Based on the position information representing the latitude, longitude, and azimuth of the other cellular phone as well as the icon code that was set in advance in the icon table of the RAM 104 with respect to the specific personal individual, the icon symbol corresponding to the icon code is displayed in the 'downloaded' local map on the screen of the display 118 in step 501. FIG. 17 shows an example of an image that is displayed on the screen of the display 118, wherein icon symbols of other cellular phones each inclined with different angles are displayed together with the icon symbol of the cellular phone 1 on the local map.

In step 502, the azimuth of the other cellular phone held by the specific personal individual is represented by an angle of inclination of the corresponding icon symbol, which is displayed on the screen of the display 118 of the cellular phone 1.

As described heretofore, this invention provides a variety of technical features and effects, which will be described below.

(1) The navigation system of this invention works in such a way that when the portable communication device (e.g., cellular phone 1) transmits the position information representing the present position thereof to the navigation server, the navigation server facilitated in the positional information center sends map information, including the present position of the portable communication device, back to the portable communication device. Based on the downloaded map information, the portable communication device displays the icon symbol (or icon character) thereof on the map while also indicating the azimuth thereof being departing from the prescribed reference position, which corresponds to the north of the map. Therefore, it is possible to display on the screen an unique image for navigation, by which the user is able to relatively recognize his/her present position and azimuth against the destination without using 'expensive' graphic processing. Hence, it is possible to provide a unique navigation system that can be easily handled by users of all ages.

(2) The navigation system of this invention is designed in such a way that the navigation server sends map information including the destination and present position of the portable communication device based on the position information representing the present position and destination of the portable communication device transmitted thereto, wherein the portable communication device downloads the map information from the navigation server so that the prescribed icon symbols representing the destination and present position of the portable communication device are displayed in the map while the azimuth of the portable communication device is indicated based on the reference directed to the north in the map. Thus, this invention provides an unique image for navigation, which is easy to recognize for users of all ages, without using expensive graphic processing.

(3) The destination corresponds to the position of the other portable communication device, for example, wherein the portable communication device receives from the other portable communication device its position information such as the latitude and longitude information. Thus, the user of the portable communication device is able to easily recognize the position of the other portable communication device, which may be owned by a communication companion, with ease.

(4) The portable communication device is capable of automatically receiving from the navigation server the position information specifying the destination such as the latitude and longitude information. Thus, the user of the portable communication device is able to recognize positions of shops, restaurants, and companies, which are registered with the navigation server facilitated in the positional information center in advance, with ease.

(5) The portable communication device applicable to the navigation system provides a positional measurement for measuring the present position thereof, an azimuth detection for detecting the azimuth thereof, and a display for displaying various information data such as maps on the screen as well as an icon display control for displaying a local map including the present position thereof, which is downloaded from the navigation server, and for displaying an icon symbol being overlapped with the map on the screen, wherein the azimuth of the portable communication device is indicated as a deviation from the prescribed reference position, which corresponds to the north of the local map. Therefore, the user of the portable communication device is able to relatively recognize the azimuth and present position thereof in relation to the destination on the screen without using expensive graphic processing. Thus, it is possible to provide a unique image for navigation, which can be easily recognized by users of all ages.

(6) The navigation server is connected with the map database for storing various map information data. Upon receipt of a request from the portable communication device, the navigation server reads from the map database the map information including the present position of the portable communication device based on the position information that is transmitted thereto from the portable communication device. Then, the navigation server sends the map information to the portable communication device. Therefore, the user of the portable communication device is able to relatively recognize the azimuth and present position of the portable communication device on the screen without using expensive graphic processing. Thus, it is possible to obtain a unique image for navigation, which is easily recognized by users of all ages.

(7) The navigation server is connected with the destination database for storing various destinations, which may be designated by the user of the portable communication device. Upon receipt of a request from the portable communication device, the navigation server reads the map information including the destination and present position of the portable communication device from the map database in association with the destination database. The map information is sent to the portable communication device. Thus, the user of the portable communication device is able to relatively recognize the azimuth and present position of the portable communication device without using expensive graphic processing. Thus, it is possible to obtain a unique image for navigation, which is easily recognized by users of all ages.

(8) In the portable communication device, the azimuth is indicated by an arrow that is displayed in proximity to the icon symbol representing the present position on the screen.

(9) In the portable communication device, the azimuth is indicated in such a way that the icon symbol representing the present position is inclined by a certain angle, which deviates from the prescribed reference position corresponding to the north of the map displayed on the screen.

As this invention may be embodied in several forms without departing from the spirit or essential characteristics thereof, the present embodiment and its modifications are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A navigation system comprising:

a portable communication device, the portable communication device including a subsystem wherein a user of the portable communication device may designate a first icon to represent the portable communication device and a second icon to represent a second communication device, the second communication device being identified by at least a phone number listed in a database in the first communication device; and a navigation server, connected with the portable communication device via a network, for providing a prescribed navigation service online in response to a request of the portable communication device, wherein upon receipt of position information representing a present position of the portable communication device, the navigation server sends map information including the present position of the portable communication device, so that the portable communication device displays the first icon over a position on the map information representing the present position of the portable communication device, and the portable communication device displays the second icon over a position on the map information representing the present position of the second communication device, and the portable communication device also indicates an azimuth thereof as an angle departing from a reference direction corresponding to a north direction of the map information.

2. A navigation system comprising:

a portable communication device, the portable communication device including a subsystem wherein a user of the portable communication device may designate a first icon to represent the portable communication device and a second icon to represent a destination; and a navigation server, connected with the portable communication device via a network, for providing a prescribed navigation service online in response to a request of the portable communication device, wherein upon receipt of position information representing a destination and a present position of the portable communication device, the navigation server sends map information including the destination and the present position of the portable communication device, so that the portable communication device displays the second icon representing the destination and the first icon representing the present position of the portable communication device on the map information downloaded thereto from the navigation server, and the portable communication device also indicates an azimuth thereof as an angle departing from a reference direction corresponding to a north direction of the map information.

3. A navigation system according to claim 1, wherein the portable communication device displays an azimuthal arrow symbol representing the azimuth thereof in proximity to the icon symbol representing the present position thereof on the map information.

4. A navigation system according to claim 1, wherein the portable communication device indicates the azimuth thereof by inclining the icon symbol representing the present position thereof by the angle departing from the reference direction corresponding to the north direction of the map information.

5. A navigation system according to claim 2, wherein the destination corresponds to a position of a second portable communication device with which the portable communication device is communicating, so that the portable communication device receives latitude and longitude information specifying the destination from the second portable communication device, and said communication is initiated by establishing a call connection by selecting an icon from a database representing the second communication device.

6. A navigation system according to claim 2, wherein the portable communication device receives latitude and longitude information specifying the destination from the navigation server.

7. A portable communication device applicable to a navigation system having a navigation server for providing a prescribed navigation service online as requested, said portable communication device comprising:

a global positioning device for measuring a present position of the portable communication device;

an azimuth detector for detecting an azimuth directed by the portable communication device;

a memory for storing at least a plurality of phone numbers and a plurality of icons, wherein a user of the portable communication device may designate a first icon to represent the portable communication device and a second icon to represent a phone number stored in the memory;

display for displaying various information data on a screen;

a wireless communicator for transmitting position information representing the present position towards the navigation server and for correspondingly receiving and downloading map information including the present position from the navigation server; and a navigation display controller for controlling the display to display an icon symbol representing the present position on the map information while indicating the azimuth by an angle departing from a reference direction corresponding to a north direction of the map information.

8. A portable communication device applicable to a navigation system having a navigation server for providing a prescribed navigation service online as requested, said portable communication device comprising:

a global positioning device for measuring a present position of the portable communication device;

an azimuth detector for detecting an azimuth directed by the portable communication device;

a memory for storing at least a plurality of phone numbers and a plurality of icons, wherein a user of the portable communication device may designate a first icon to represent the portable communication device and a second icon to represent a phone number stored in the memory;

a display for displaying various information data on a screen;

a wireless communicator for transmitting position information representing a destination and the present position towards the navigation server and for correspondingly receiving and downloading map information including the destination and the present position from the navigation server; and a navigation display controller for controlling the display to display icon symbols representing the destination and the present position on the map information while indicating the azimuth by an angle departing from a reference direction corresponding to a north direction of the map information.

9. A portable communication device according to claim 7, wherein the navigation display controller controls the display to display an azimuthal arrow symbol representing the azimuth in proximity to the icon symbol representing the present position on the map information.

10. A portable communication device according to claim 7, wherein the navigation display controller controls the display to indicate the azimuth by inclining the icon symbol representing the present position by the angle departing from the reference direction corresponding to the north direction of the map information.

11. A portable communication device according to claim 8, wherein the destination corresponds to a position of a second portable communication device, so that the wireless communicator receives from the second portable communication device latitude and longitude information specifying the destination, based on which the navigation display controller controls the display to display the icon symbol representing the destination on the map information.

12. A portable communication device according to claim 8, wherein the wireless communicator receives from the navigation server latitude and longitude information specifying the destination, based on which the navigation display controller controls the display to display the icon symbol representing the destination on the map information.

13. A portable communication device that is connectible with a navigation server for providing a prescribed navigation service as requested via a network, comprising:

- a memory for storing at least a plurality of phone numbers and a plurality of icons, wherein a user of the portable communication device may designate a first icon to represent the portable communication device and a second icon to represent a phone number stored in the memory;
- a GPS module for receiving signals from GPS satellites to determine a present position, which is two-dimensionally defined using a latitude and a longitude;
- an electronic compass module for detecting an azimuth;
- a display for displaying various data on a screen;
- a wireless communicator for transmitting position information representing the present position towards the navigation server and for correspondingly receiving and downloading map information including the present position from the navigation server; and
- a navigation display controller for controlling the display to display the first icon representing the portable communication device at the present position on the map information while indicating the azimuth by an angle departing from a north direction of the map information and the second icon at the present position of a communication device assigned the phone number on the map information.

14. A portable communication device according to claim 13, wherein a user designates a third icon to represent a destination and the wireless communicator downloads from the navigation server the map information including the destination and present position, based on which the navigation display controller controls the display to display the third icon representing the destination in addition to the first icon representing the present position on the map information.

15. A portable communication device according to claim 13, wherein the navigation display controller indicates the azimuth by displaying an azimuthal arrow symbol in proximity to the icon symbol representing the present position on the map information.

16. A portable communication device according to claim 15, wherein response to the detected azimuth, the azimuthal arrow symbol is selected from among a plurality of azimuthal arrow symbols, which are allocated to plurality of azimuthal ranges respectively.

17. A portable communication device according to claim 13, wherein the navigation display controller indicates the azimuth by inclining the icon symbol representing the present position by the angle departing from the north direction of the map information.

* * * * *